US008214888B2

United States Patent
Noe et al.

(10) Patent No.: US 8,214,888 B2
(45) Date of Patent: Jul. 3, 2012

(54) TWO-FACTOR USB AUTHENTICATION TOKEN

(75) Inventors: Frederik Noe, Roeselare (BE); Frank Hoornaert, Wemmel (BE); Dirk Marien, Ranst (BE); Nicolas Fort, Bordeaux (FR)

(73) Assignee: Vasco Data Security, Inc., Oakbrook Terrace, IL (US)

( * ) Notice: Subject to any disclaimer, the term of this patent is extended or adjusted under 35 U.S.C. 154(b) by 673 days.

(21) Appl. No.: 12/138,979

(22) Filed: Jun. 13, 2008

(65) Prior Publication Data

US 2009/0193511 A1 Jul. 30, 2009

Related U.S. Application Data

(60) Provisional application No. 61/006,767, filed on Jan. 30, 2008.

(51) Int. Cl.
*G06F 7/04* (2006.01)
*G06F 15/16* (2006.01)
*G06F 17/30* (2006.01)
*H04L 29/06* (2006.01)

(52) U.S. Cl. .......................................... 726/9
(58) Field of Classification Search ........................ 726/9
See application file for complete search history.

(56) References Cited

U.S. PATENT DOCUMENTS

| | | | |
|---|---|---|---|
| 2004/0098596 A1 | 5/2004 | Elteto et al. | |
| 2004/0230805 A1* | 11/2004 | Peinado et al. | 713/181 |
| 2004/0268135 A1 | 12/2004 | Zimmer et al. | |
| 2005/0109841 A1 | 5/2005 | Ryan et al. | |
| 2006/0226950 A1 | 10/2006 | Kanou et al. | |
| 2007/0016965 A1 | 1/2007 | Dan et al. | |
| 2007/0061491 A1* | 3/2007 | Kerdemelidis et al. | 710/1 |

OTHER PUBLICATIONS

Compaq, Hewlett-Packard, Intel, Lucent, Microsoft, NEC and Philips; Universal Serial Bus Specification; Revision 2.0; Apr. 27, 2008; pp. 650.

* cited by examiner

*Primary Examiner* — Edan Orgad
*Assistant Examiner* — Harris Wang
(74) *Attorney, Agent, or Firm* — RatnerPrestia

(57) ABSTRACT

The present patent application discloses a USB token that advantageously mimics a human interface device such as a keyboard in interacting with a host computer, thus removing the need for pre-installation of a dedicated device driver. This is accomplished by requiring the host computer to direct the input of the attached human interface devices of the keyboard type, including the USB token, exclusively to the program interacting with the USB token, by using cryptographic algorithms based on a shared secret, which require less data to be transferred than PKI-based algorithms, and by employing an efficient encoding scheme that minimizes the time needed to exchange information with the USB token, and minimizes the probability of generating ambiguity with input that might legitimately be generated by other attached human interface devices. By using only symmetric encryption and the low-speed USB protocol, a single low-performance processor may be used, which results in a more cost-effective solution than PKI USB tokens emulating the combination of smart cards and smart card readers or USB tokens presenting themselves to the host computer as mass storage devices. The overall security is increased by adding a second authentication factor consisting of a static password entered by the user, and by limiting the number of valid token response that can be generated or retrieved in a usage session.

67 Claims, 4 Drawing Sheets

TWO-FACTOR USB AUTHENTICATION TOKEN

REFERENCES

This application claims the benefit of the priority date of U.S. provisional patent application no. 61/006767 of Jan. 30, 2008, the entirety of which is incorporated by this reference.

TECHNICAL FIELD

The invention relates to securing remote access to computers and applications and remote transactions over computer networks. More specifically, the invention relates to client authentication and transaction signature capabilities using a two-factor USB authentication token.

BACKGROUND ART

As remote access of computer systems and applications grows in popularity, the number and variety of transactions which are accessed remotely over public networks such as the Internet has increased dramatically. This popularity has underlined a need for security, in particular authentication and data integrity. Authentication deals with ensuring that people who are remotely accessing an application are who they claim they are and ensuring that the transactions being conducted remotely are initiated by legitimate individuals. Data integrity deals with ensuring that transaction data has not been altered before being received at an application server.

In the past, application providers have relied on static passwords as client credentials to provide the security for remote applications. In recent years, it has become evident that static passwords are not sufficient and that more advanced security technology is required.

Several software or hardware based solutions have been devised to provide a higher level of security. The most important ones are hardware-based strong authentication tokens, smart cards, USB tokens, and authentication software. These solutions and their respective advantages and disadvantages will be discussed in the following paragraphs.

A hardware-based strong authentication token is a pocket-size battery-powered device with its own display and keypad. In some cases the keypad is reduced to a single button or even completely omitted. The main purpose of a strong authentication token is to generate so-called 'One-Time Passwords' (OTPs) as client credentials. In some cases strong authentication tokens are also capable of generating electronic signatures or Message Authentication Codes (MACs) on data that has been entered on the token's keypad (these signatures and MACs are also considered to be covered by the term "client credentials"). If the token has a keypad, the usage of the token is often protected by a personal identification number (PIN). To be able to generate OTPs or MACs, strong authentication tokens are capable of performing cryptographic calculations on a dynamic variable, such as a time indicator, a counter, a challenge or transaction data, based on symmetric cryptographic algorithms parameterized with a secret value or key. Typical examples of such symmetric cryptographic algorithms parameterized with a secret value or key are symmetric encryption/decryption algorithms, such as DES (Data Encryption Standard), 3DES (Triple Data Encryption Standard), or AES (Advanced Encryption Standard), and/or keyed one-way hash functions (such as MD5 or SHA-1 in OATH compliant tokens).

The advantages of hardware-based strong authentication tokens include a very high level of security, independence of application, and independence of delivery channel (there is no need to install any driver).

Disadvantages include a certain minimum size and volume due to the presence of display, battery and keypad; a certain minimum cost due to the presence of those same elements; and practical limitations on the nature and size of data that can be signed (because all data needs to be manually input by the user on a keypad, which is usually numerical).

Smart cards are essentially microprocessors embedded in a credit card sized piece of plastic. They are often capable of performing sophisticated cryptographic algorithms. Examples include so-called EMV-compliant bank cards (EMV is the abbreviation of "Europay, Mastercard, Visa") to secure payments and PKI (Public Key Infrastructure) cards capable of making generic digital signatures on any kind of electronic data.

Advantages of smart cards include a high level of security, broad applicability to a wide range of applications (securing payments, protecting e-mail, computer login, signing electronic documents, . . . ), and a very practical form factor (they can be carried along with credit cards in a wallet).

Disadvantages include a complex technical interface (requiring specific command structures and drivers), dependence on specific reader infrastructure (which very often means that end users have to install smart card readers on their client computers, which is not always possible), and relatively high direct and indirect costs.

USB (Universal Serial Bus) authentication tokens try to overcome some of the major disadvantages of smart cards by combining into a single hardware device the functions of both a smart card reader and a smart card. Usually such USB tokens offer the same functionality as PKI enabled smart cards. USB tokens interact with a host according to the USB specification [USB Implementers Forum. Universal Serial Bus Specification Revision 2.0. Compaq Computer Corporation et al., 2000.].

Disadvantages of USB tokens include the need to install a driver prior to use, specific security issues (once connected and unlocked, malicious software can ask the token to perform security sensitive operations without the user noticing), and—for PKI-based USB tokens—high cost and a need for large amounts of data to be exchanged.

Several software-only security solutions exist whereby all cryptographic operations are done on the user's PC instead of in dedicated hardware. One example of such software solutions is comprised of so-called software certificates whereby a PKI private key and certificate are stored in a software repository. Another example is comprised of so-called software tokens which emulate in software the functionality of hardware strong authentication tokens.

By avoiding the need for hardware, these software solutions try to circumvent the cost and complexity often associated with rolling out hardware solutions. However, since the cryptographic calculations take place on the user's PC, all secret keys involved in these calculations must appear in the clear at least at some time on this PC. This makes software solutions inherently less secure. Another disadvantage of software solutions is that quite often they rely on a file with cryptographic secrets being present on the client PC. This considerably reduces the ability of the user to work from any client PC (mobility).

DISCLOSURE OF THE INVENTION

Technical Problem

What is needed is an authentication and signature solution that combines the advantages of the solutions described above:

ease of use;

very moderate cost;

protection level of cryptographic keys similar to hardware-based strong authentication tokens, smart cards, USB tokens;

operable on a very wide range of client PCs without requiring driver installation;

compact and easy to carry.

USB tokens come close to meeting all goals, the main remaining impediment being the requirement to preinstall a dedicated driver on the host computer prior to using a USB token. This disadvantage is well known, and some workarounds are known in the art. The "Driverless USB Security Token" invented by Laszlo Elteto et al., and disclosed in US 20040098596 A (RAINBOW TECHNOLOGIES, INC.) Nov. 10, 2003, avoids the issue by making the USB token mimic the behavior of a class of devices for which a preinstalled driver is included in the host computer's operating system. These classes include. USB hubs, mass storage devices, and human interface devices (HIDs). It can be foreseen that in some contexts, the use of detachable portable mass storage devices would be disabled for security reasons, e.g. to avoid illicit copying by users of information stored on the host computer's fixed storage media. Such a policy obviously also disables the use of USB tokens relying on the driver for USB mass storage devices, such as those proposed by Elteto et al.

Under the USB architecture, human interface devices operate according to the Device Class Definition for Human Interface Devices [USB Implementers' Forum. Device Class Definition for Human Interface Devices (HID) Version 1.11. USB Implementers' Forum, 2001.]. With respect to the emulation of human interface devices, Elteto et al. state that "[although] the token 200 can emulate a variety of HIDs, it should not ordinarily emulate a keyboard 114 or mouse 116 as that would interfere with the normal use of the computer 102."

Technical Solution

The present invention is based on the insight that, contrary to the opinions found in the prior art, a USB authentication token can advantageously mimic a human interface device such as a keyboard in interacting with a host computer, thus removing the need for pre-installation of a dedicated device driver. The present invention accomplishes this by (1) requiring the host computer to direct the input of the attached human interface devices of the keyboard type, including the USB token, exclusively to the program interacting with the USB token, by (2) arranging the token to use cryptographic algorithms based on a shared secret, which require less data to be transferred than PKI-based algorithms, and by (3) employing an efficient encoding scheme that (a) minimizes the time needed to exchange information with the USB token, and (b) minimizes the probability of generating ambiguity with input that might legitimately be generated by an attached human interface device or devices. It is furthermore advantageous to reduce the length of any messages sent from the host computer to the token (and therefore the maximum entropy of the dynamic value that can be encoded within such a token message) to be as small as the required security allows so as to minimize the transfer time and maximize the user experience.

The present invention is further based on the insight that the usage of only symmetric encryption and the low-speed USB protocol permits the usage of a single low-performance processor which results in a more cost-effective solution than PKI USB tokens emulating the combination of smart cards and smart card readers or USB tokens presenting themselves to the host computer as mass storage devices.

In a multi-tasking operating system with a graphical user interface, the keyboard "focus" property determines which program or application window receives information about the user's keystrokes. This is an essential concept to allow multiple programs to run simultaneously and share a single set of human interface devices, without messing up the input to all these programs. The requirement that the host computer direct the input of the attached keyboards and emulated keyboards to the running instance of the program interacting with the USB token, comes down to capturing the keyboard focus. This can be accomplished by requesting the keyboard focus by means of an API call of the operating system (e.g., in Java 1.4 and greater, using the Component.requestFocus( ) method), and by subsequently monitoring the state of the keyboard focus to make sure that focus is being retained. Only if the focus is retained for the entire duration of the incoming message, can one be sure that no parts of the message got lost (i.e., got sent to other running programs).

Authentication algorithms using a dynamic variable and based on shared secrets may consist of encrypting the dynamic variable with a well-known symmetric cipher such as DES, 3DES, AES, RC4, blowfish, and twofish, or hashing the dynamic variable with a keyed hash algorithm such as SHA and HMAC, using the shared secret as the key. These examples are not limitative, as it shall be obvious for someone skilled in the art that many other methods and algorithms exist to cryptographically combine a dynamic variable with a secret shared between client and server. By judiciously combining the cryptographic operations, a "best of both worlds" solution can be designed that reuses existing static password verification infrastructure, while adding a strong authentication front-end (based on the shared secret in the token, and a dynamic variable which may be presented by the server). The present invention achieves this by including an encrypted static password in the dynamic client credential, the encryption key for which is cryptographically derived from the dynamic variable and the shared secret. This aspect makes the token according to the invention a very attractive choice for migrating existing static password-based services to a strong authentication platform.

The requirements of the encoding scheme can be achieved according to the encoding presented in the preferred embodiment. A USB token according to the invention behaves as a Keyboard member of the Human Interface Device (HID) class. Hence, two relevant layers can be distinguished in the communication protocol between the USB token according to the invention and the host computer: the standard USB HID Keyboard Device protocol, and a layer specific to this invention, hereinafter called the "Key Stroke Protocol". The Key Stroke Protocol is used to transport the Command and Response packets by means of this standard system keyboard functionality. The data link and the transport mechanism are different for outgoing messages (from the client application to the USB token according to the invention) and incoming messages (from the USB token according to the invention to the client application). The Data Link Layer Protocol for the outgoing messages is a bit-oriented protocol, whereby message transport is realized through the simulation of CAPS, NUM and SCROLL Lock keystrokes by the client application. Any such change in the state of CAPS, NUM and SCROLL is broadcast by the System Keyboard driver to all attached keyboards including the USB token according to the invention. These broadcast state changes are used to construct outgoing data frames that contain Command messages. The transport of incoming messages uses keystrokes sent by the USB token according to the invention and received by the client application. These keystrokes will build frames of incoming data that contain Response messages. In order to minimize the chance of providing nonsensical input to unintended recipients (i.e., other applications running concurrently with the client application in a multitasking environment), it is an option to restrict the keystrokes sent by the USB token to non-printable characters. Conversely, this restriction also reduces the chance that text being typed on an actual USB keyboard is mistaken by the client application for a USB token transmission. On the other hand, it is also an option to restrict the keystrokes sent by the USB token to characters that can be generated by physical keystrokes on standard keyboards, thus avoiding the risk of some operating systems filtering out certain emulated keystrokes which would prevent them from reaching the intended application.

It is an additional inventive aspect that the security level of a challenge-response based authentication solution wherein the required user interaction is minimal and wherein the challenge entropy is relatively low can be increased by limiting the number of valid responses that can be generated or retrieved in a given time frame.

Advantageous Effects

Two-factor authentication systems augment the delivered level of security with respect to single-factor authentication systems based on static passwords, by providing security against theft and replay of static passwords. USB tokens are a cost-effective way of realizing two-factor authentication: as they rely on the host computer for the interaction with the user, they don't require a display or keypad, and as they extract power from the USB interface, they don't require a battery. By not requiring a keypad, display, or battery, USB tokens can be produced at very low cost and can have smaller physical dimensions which makes them more convenient to transport.

A USB token without dedicated driver requirement is particularly easy to use because the user simply has to plug it into one of the USB-ports of his computer and enter his static password; no additional software has to be installed on the computer, and many people are already familiar with USB sticks. This is a fortiori true for a USB token that uses a generic class driver for a class of USB drivers that can be assumed to be supported by a very wide range of computer systems and for which it is very unlikely that support will be disabled.

USB tokens according to the invention are even more cost-effective, by providing two-factor authentication without the nice but expensive functions of storage, asymmetric encryption and digital signatures (PKI). Because of its support for strong symmetric cryptography and the hardware protection of the keys being used, the device is capable of providing authentication and signature functions with a security level that is comparable to that of smart cards. The USB token according to the invention presents itself as a HID, and hence it can use the "low-speed USB protocol". This, in combination with symmetric cryptography, allows an implementation by means of a single low-performance microprocessor, which lowers the cost for devices according to the invention. As the USB token according to the invention presents itself more specifically as a keyboard, it is accessible from virtually any application, including applications running inside a web browser (e.g., Java applets), regardless of local security settings.

USB tokens that are challenge-response based and that limit the number of valid responses that can be generated or retrieved increase the overall security level by making it more difficult for attackers to compile a dictionary of valid challenge-response pairs. This is especially valuable in cases where the length (and thus the entropy) of the challenges is relatively low in order to enhance the user experience by reducing the time needed to communicate the challenge from the host computer to the USB token.

The foregoing and other features and advantages of the invention will be apparent from the following, more particular description of several embodiments of the invention, as illustrated in the accompanying drawings.

BEST MODE FOR CARRYING OUT THE INVENTION

Figure 1:
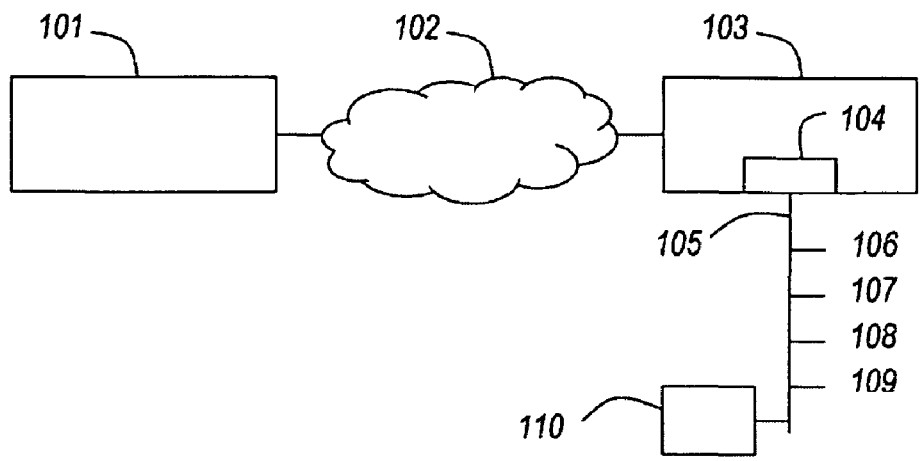
FIG. 1 illustrates a context in which the invention may be used. A server 101 communicates with a client computer 103 over a general-purpose network 102 (e.g., the Internet). Client computer 103 comprises a USB host controller 104, coupled to a USB personal area network 105. A plurality of USB end points 106-109 may be attached to the USB personal area network 105. The USB token 110 is a token according to the invention, also attached to the USB personal area network 105.
Figure 2:
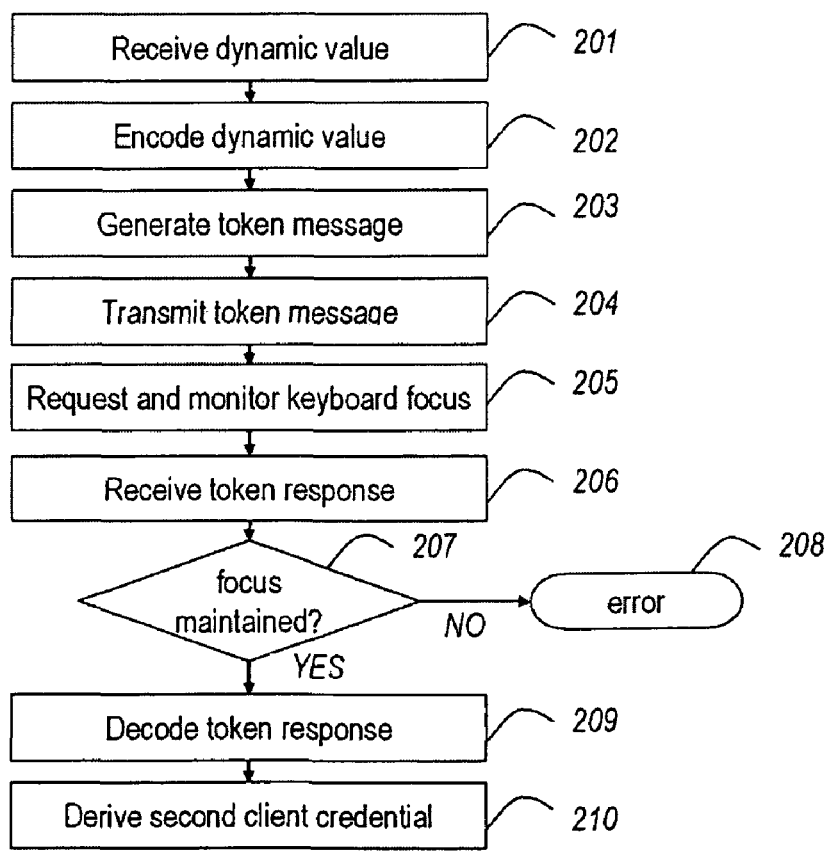
FIG. 2 illustrates a method according to the invention, comprising the steps of receiving a dynamic value 201 (optional); encoding the dynamic value into a token message 202 (optional); generating a token message 203; transmitting the token message for reception by a token 204; requesting the keyboard focus and starting to monitor its status 205 (optional); receiving a response from the token 206; verifying if the keyboard focus was maintained during the reception of the token response 207 (optional) and in the affirmative decoding the token response to retrieve a first client; credential 209, in the negative declaring an error 208; deriving a second client credential from the decoded client credential 210 (optional).
Figure 8:
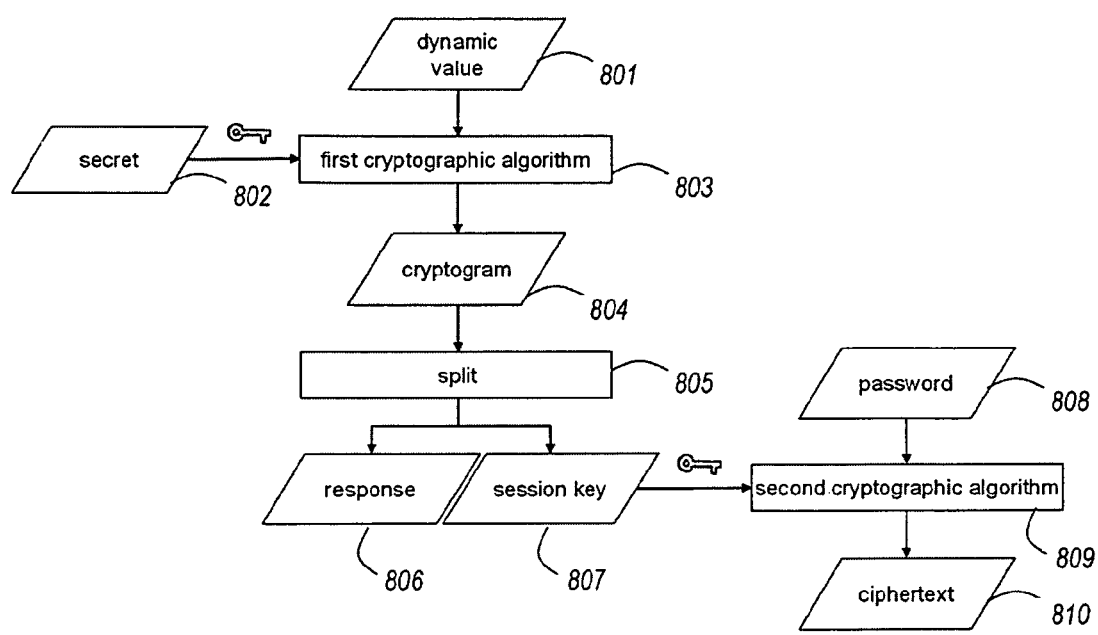
FIG. 8 illustrates a particular way for the apparatus according to the invention to generate a client credential consisting of a response 806 and a ciphertext 810, wherein a dynamic value 801, a secret 802, and a password 808, are advantageously combined through a combination of a first cryptographic algorithm 803 and a second cryptographic algorithm 809.

The preferred embodiment of the present invention consists of an authentication and signature hardware device with the following features:

- it has the form factor of a small USB stick;
- it is equipped with a USB interface so that it can be plugged into the USB port of a host computer;
- it has a microprocessor capable of symmetric cryptography;
- it is personalized with at least one secret symmetric key;
- it presents itself to the host computer as a USB Human Interface Device (HID);
- it communicates with the host computer and receives electrical power via the USB interface;
- it relies on the host computer for any interface with the user;

The preferred embodiment will be detailed with reference to FIG. 1, where relevant, and will be referred to as USB token 110. Where mention is made of the internals of USB token 110, these will be detailed with reference to other figures, where relevant. To clarify the functions of USB token 110, the following usage scenario is offered as an example. When a user wants to authenticate himself to a certain server 101, he might proceed as follows:

- The user opens his browser on host computer 103 and surfs to the website hosted by server 101, using the network 102. The server 101 generates a random challenge and sends this to the user, together with a Java applet. The Java applet is displayed in the user's browser.
- The Java applet looks for USB token 110 on the user's computer 103 using the standard Java API functionality. If it does not detect USB token 110, it asks the user to plug-in the token into the computer 103.
- The user enters his username and password into the Java applet.
- The Java applet forwards the challenge from the server and the password entered by the user to the USB token 110. The USB token 110 performs a number of cryptographic operations, using a secret stored inside the token, which are illustrated in FIG. 8. First, the token encrypts 803 the challenge 801 using 3DES and the secret 802. The result of this encryption operation 804 is split 805 into two parts: the first part is called the Response 806, and the second part is called the Session key 807. The Session key 807 serves as the key for a DES CBC encryption 809 of the static password 808, which is padded prior to encryption to ensure a proper block length. The result of this operation is called Ciphertext 810. The token sends the Response 806 and Ciphertext 810 back to the Java applet. In an alternative embodiment, the Java applet forwards only the challenge to the USB token 110. The USB token 110 encrypts the challenge using 3DES and the secret. The result of this encryption is sent back to the Java applet, where it is split into two parts: the first part is called the Response, and the second part is called the Session key. The Session key is used by the Java applet as the key for a DES CBC encryption of the static password, which is padded prior to encryption to ensure a proper block length.
- The Java applet forwards username, Response and Ciphertext to the server 101.
- The server 101 then verifies the authentication attempt as follows. In order to synchronize the Java applet and server 101, the server 101 verifies the response. The verification is based upon Response, Challenge, and the secret. Upon successful verification of the Response, a Session key is generated. This Session key subsequently serves as the decryption key for the Ciphertext. The result of the decryption is a static password. The server 101 forwards the static password to the back-end IT infrastructure for verification.

Figure 3:
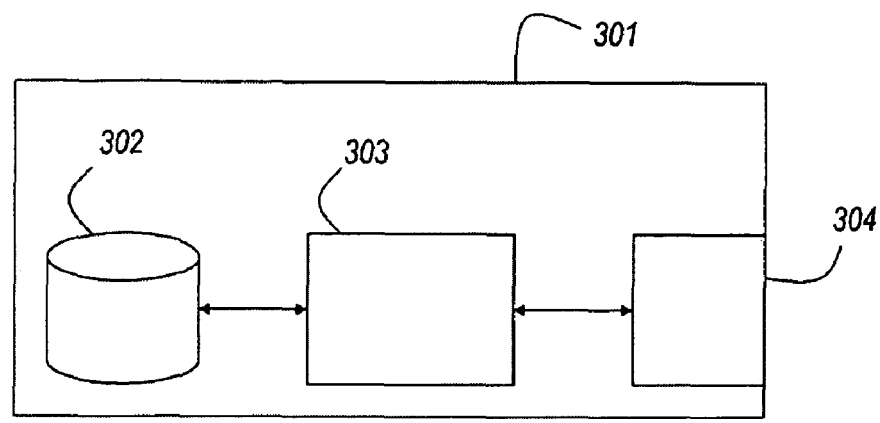
FIG. 3 illustrates an apparatus 301, according to the invention, comprising a USB interface 304 for interacting with a computer through emulation of a human interface device, a memory 302 for storing a secret shared with said server, and an agent 303 for generating credentials based on at least said secret and at least a dynamic value.

USB token 110 (shown as USB token 301 in FIG. 3) consists minimally of a microprocessor 303 in a slim housing with a USB compatible connector 304 to connect it to a host computer 103. In a typical embodiment the host computer 103 would be the user's PC. The overall physical form factor is that of a USB device resembling the so-called "memory stick". In a typical embodiment, USB token 110 has no display or keypad. In one particular embodiment, USB token 110 is provided with a LED.

USB token 110 is powered by the host computer 103.

The at least one microprocessor has access to a non-volatile memory 302 containing at least some personalized data including at least one symmetric secret key. In some embodiments the personalized data can also include extra secret keys and/or a serial number and/or one or more PIN codes or passwords to protect access to the functionality of the preferred embodiment.

USB token 110 is capable of performing at least one symmetric cryptographic algorithm. The terminology 'symmetric cryptographic algorithm' should be understood in a broad sense. It includes all cryptographic algorithms whereby the same secret key is used to both generate a cryptogram and verify said generated cryptogram. In particular, it includes keyed hashing algorithms.

Communication between Host Computer 103 and USB token 110

USB token 110 is a USB peripheral device that behaves as a Keyboard member of the Human Interface Device (HID) class. The behavior as Keyboard precludes the need to maintain and install a USB driver with the targeted Operating Systems (Microsoft Windows 2000 and later, Apple MacOS X, and Linux with kernel version 2.6 and later).

USB token 110 is intended to be interfaced from host computer 103 resident application software. In a preferred embodiment this host computer 103 resident application software takes the form of a Java applet that can be installed during a visit to the application or service provider web site.

Two relevant layers can be distinguished in the communication protocol between USB token 110 and the Host Computer 103: the standard USB HID Keyboard Device protocol, and the layer specific to this invention (hereinafter the "Key Stroke protocol").

Standard USB HID Keyboard Device Protocol

From the USB interface point of view, USB token 110 presents itself to the Host computer as a standard USB HID Keyboard Device. This implicates compatibility with the following aspects defined by the USB standard:

- mechanical aspects of the preferred embodiment connector;
- electrical characteristics, signaling, data transport, protocol;
- USB device properties.

Key Stroke Protocol

USB token 110 presents itself as a standard USB HID keyboard device. This approach allows a client application to use USB token 110 by invoking standard system keyboard functionality and using standard HID interactions, and avoids the need to install a specific device driver. The Key Stroke Protocol is used to transport the Command and Response packets by means of this standard system keyboard functionality. It is responsible for the following:

framing/de-framing of command and response packets into Key Stroke Messages;
encoding Key Stroke Command Messages into keystrokes;
decoding keystrokes into Key Stroke Response Messages;
communication error checking.

The Key Stroke Protocol provides a data link—on top of the standard keyboard functionality—between the client application on the host computer 103 and USB token 110. The data link and the transport mechanism are different for outgoing messages (client application to USB token 110) and incoming messages (USB token 110 to client application).

The Data Link Layer Protocol for the outgoing messages is a bit-oriented protocol. The transport of outgoing messages is realized through the simulation of CAPS, NUM and SCROLL Lock keystrokes by the client application. The transport mechanism relies on the principle that any change in the state of CAPS, NUM and SCROLL is broadcast by the System Keyboard driver to all attached keyboards including USB token 110. These broadcast state changes are used to construct outgoing data frames that contain Command messages.

The transport of incoming messages uses emulated keystrokes sent by USB token 110 and received by the client application. These keystrokes will build frames of incoming data that contain Response messages.

Outgoing Key Stroke Messages

The list below describes the typical properties of the defined outgoing messages:

The special START flag (8 consecutive logic ones) defines the start of a Transmit Message Body. Bit stuffing is used to avoid de-synchronization between transmitter and receiver: whenever 7 consecutives ones appear in the message payload, a zero is inserted. Note that other embodiments could use another bit pattern for the START flag.

Every defined Transmit Message has a predefined message length.

A Transmit Message Body always starts with one command byte, composed of two 4-bit nibbles: the leading digit from the message CRC16-CCITT value is the most significant nibble, and the 4-bit Command Identifier is the least significant nibble.

Depending on the Command Identifier, the Transmit Message Body may contain a Data Field from 1 to 16 bytes.

Outgoing messages are transmitted by changing the states of CAPS LOCK, NUM LOCK and SCROLL LOCK. These state changes are forced by the client application posting keystrokes in the system keyboard queue. The system keyboard driver will then broadcast these changes to all attached keyboards. For a standard USB HID keyboard the CAPS LOCK, NUM LOCK and SCROLL LOCK states are sent to the keyboard in the format of a Report_out data packet. This is a data packet of 1 byte carrying 3 bits of information in the following format (individual bits labeled b7 through b0):

b7-b3: not used
b2 (SCROLL lock state): 0=off, 1=lock on
b1 (CAPS lock state): 0=off, 1=on
b0 (NUM lock state): 0=off, 1=on To transport a complete outgoing Key Stroke Message, the Key Stroke Message is sent serially to USB token 110. Note that on some operating systems the system keyboard driver only broadcasts the lock states if at least one of the lock states is changed, so every Report_out data packet must contain at least one bit that has changed with respect to the previous Report_out data packet. Note also that on some operating systems the system keyboard driver does not allow a client application to atomically change more than one lock state at a time, i.e. separate keystrokes must be posted to change different lock states. This means that the change of more than one lock state can result in a broadcast from the keyboard driver to the attached keyboards of more than one Report_out data packet.

The invention supports multiple transport modes. In some transport modes, the Keystroke Protocol uses 1 or 2 bits of the Report_out to transmit 1 or 2 bits of the serialized outgoing Key Stroke Message, and uses a change in another bit of the Report_out to ensure that there is at least one of the LOCK states that has changed so that a Report_out is effectively generated and sent to the token and/or to allow the token to distinguish which received Report_out data packets are relevant and which have to be ignored.

Figure 6:
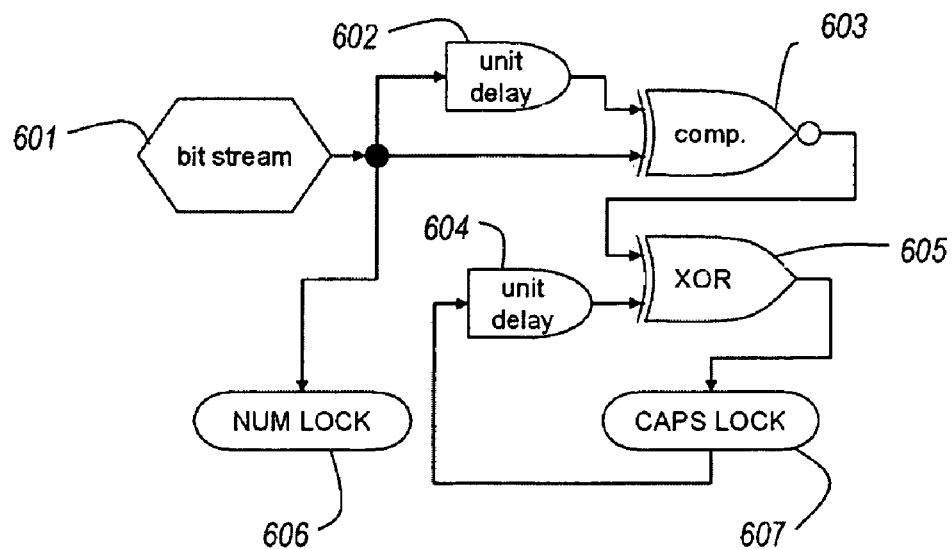
FIG. 6 illustrates an encoding scheme designed to map bits 601 onto Report_out data packets representing changes in the state of NUM LOCK 606 and CAPS LOCK 607.

The actions needed to serially send a Key Stroke Protocol Message to USB token 110 using the 1-bit Key Stroke Protocol are illustrated in FIG. 6. Those actions consist of repeatedly setting the NUM lock state 606 equal to the next data bit 601, while toggling the CAPS lock state 607 if and only if two identical data bits are to be sent consecutively (as represented in FIG. 6 by the operation of comparator 603, XOR gate 605, and unit delays 602 and 604); and inserting a wait time to allow the system to broadcast the updated lock states to the keyboards. In some embodiments, the wait time insertion is replaced by an explicit confirmation step, whereby the token 110 sends a message to the host system 103 to confirm receipt of a Report_out message. In some particular embodiments, the confirmation message contains a representation of the state of one or more of NUM lock, CAPS lock, and SCROLL lock, that results from the received Report_out message. In some particular embodiments, the confirmation message is sent using scan codes that do not represent printable characters, and that are hence very unlikely to interfere with any application that happens to have keyboard focus. Such keystrokes can include SHIFT, CTRL, ALT GR. In some other embodiments either a wait time insertion or an explicit confirmation step can be used, for example depending on which part of the outgoing message is being sent. For example in some particular embodiments the wait time insertion can be used for the START flag While an explicit confirmation is used for the rest of the message.

Figure 7:
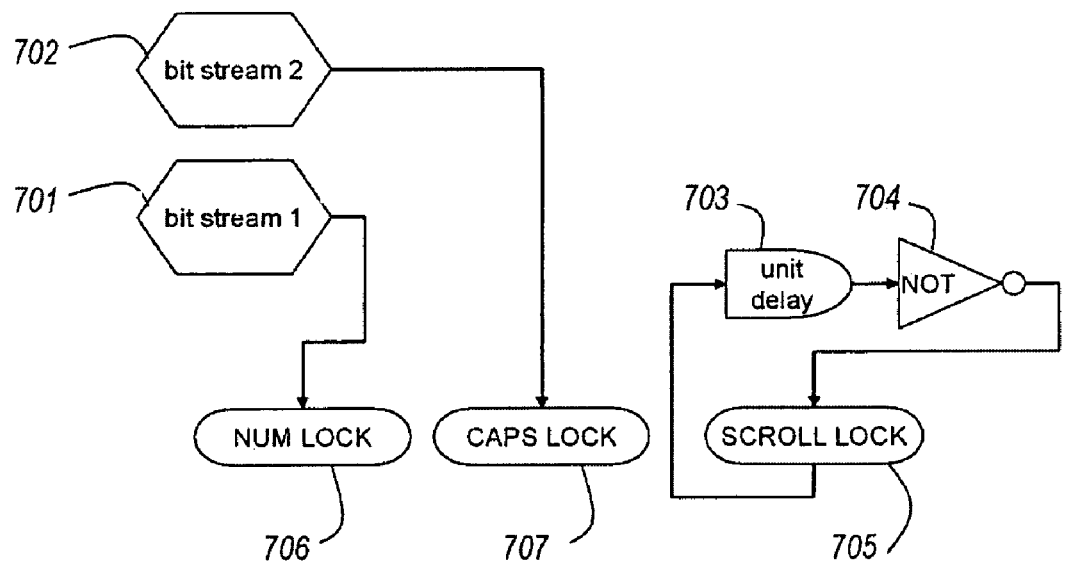
FIG. 7 illustrates an encoding scheme designed to map sets of two bits 701 and 702 onto Report_out data packets representing changes in the state of SCROLL LOCK 705, NUM LOCK 706, and CAPS LOCK 707.

The actions needed to serially send a Key Stroke Protocol Message to USB token 110 using the 2-bit Key Stroke Protocol are illustrated in FIG. 7. They consist of sending a SCROLL lock sync packet (leave NUM lock unchanged, clear CAPS lock and then toggle SCROLL lock); repeatedly setting the NUM lock 706 and CAPS lock 707 states from 2 data bits 701 and 702, while always toggling the SCROLL lock state 705 (the toggling being represented in FIG. 7 by the operation of NOT gate 704 and unit delay 703); and inserting a wait time after posting every 2-bit frame to allow the system to broadcast the updated lock states to the keyboards by means of one or more Report_out data packets. In some embodiments, the wait time insertion is replaced by an explicit confirmation step, whereby the token 110 sends a message to the host system 103 to confirm receipt of a Report_out message or 2-bit frame. In some particular embodiments, the confirmation message contains a representation of the state of one or more of NUM lock, CAPS lock, and SCROLL lock, that results from the received Report_out message. In some particular embodiments, the confirmation message is sent using scan codes that do not represent printable characters, and that are hence very unlikely to interfere with any application that happens to have keyboard focus. Such keystrokes can include SHIFT, CTRL, ALT GR. In some other embodiments either a wait time insertion or an explicit confirmation step can be used, for example depending on which part of the outgoing message is being sent. For example in some particular embodiments the wait time insertion can be used for the START flag while an explicit confirmation is used for the rest of the message. The USB token only needs to consider the received Report_out data packets of which the SCROLL lock state has toggled with respect to the SCROLL lock state of the previously received Report_out data packet, and can discard all other received Report_out data packets. As long as the token has not yet received any Report_out data packet, the token has no way of knowing the actual lock states. This means that the actual lock states as assumed by the host computer and the lock-states assumed by default by the token might be out of sync. If the SCROLL lock state of the token and the SCROLL lock state of the host computer are different when the first Report_out data packet of the Key Stroke Protocol Message is sent, the token will not perceive the change in the SCROLL lock state and therefore it will discard this first Report_out data packet. This problem can be solved by transmitting at least one dummy bit prior to the START flag. By preference this dummy bit has a different value than the first bit of the START flag. In case the first START flag bit is a 1, a SCROLL lock sync packet could be generated as follows: leave NUM lock unchanged, clear CAPS lock and then toggle SCROLL lock.

In another transport mode, which can be seen as an improvement of the 1-bit Key Stroke Protocol, the NUM lock state is set equal to the next data bit to be sent; if the NUM lock state has thus been toggled the CAPS lock state and the SCROLL lock state are not toggled, if however the NUM lock state has thus not been toggled either the CAPS lock state or the SCROLL lock state is toggled whereby the value of the data bit following the data bit coded in the NUM lock state determines whether the CAPS lock state or SCROLL lock state is toggled. For reasons similar to the reasons explained for the 2-bit Key Stroke Protocol, also for this variant it is preferable that one or more sync packets are sent prior to sending the first bit of the START flag. Alternatively, the START flag might be sent using the original 1-bit Key Stroke Protocol and only the data bits of the payload of the Key Stroke Protocol Message are sent using the coding just described.

In yet another transport mode the serialized outgoing Key Stroke Message is first encoded into a sequence of ternary symbols which is then converted into a sequence of Report_out data packets where two consecutive Report_out data packets always differ from one another in exactly one of the three lock states. The ternary symbol to be transported determines which of the three lock states is changed.

Whenever the time between 2 consecutive received Report_out packets is larger than the current configured Inter-Report Timeout, the USB token 110 will drop any frame in progress and reset its receiving state machine. Thereafter USB token 110 resumes waiting for a start sequence.

Incoming Key Stroke Messages

The data returned by USB token 110 to the Host System 103 is carried across 8-bit data bytes in "Output Reports", following the Device Class Definition for USB Human Interface Devices (HID).

The Data Link Layer Protocol is a byte-oriented protocol that allows variable length messages delimited by special START and END bytes, whereby the special START byte (0x01) defines the start of a Message Body and the special END byte (0x03) defines the end of a Message Body. A Response Message Body always starts with the CRC16-CCITT for the Command message that provoked the response message. A Response Message Body always ends with the CRC16-CCITT for all bytes in the Message Body, starting with the Command CRC and up to the last Data Field byte. A Response Message Body always contains a Response ID in the first byte that follows the Command CRC. A Response Message Body may contain a Data Field of up to 16 bytes in length.

In the Response Message Body all data bytes that take value 0x01 and value 0x03 must be translated in order to avoid confusion with the START and END bytes. This is implemented using a Sequence Escape (ESC) byte 0x02 (ASCII <STX>) plus the bit-wise complement of the original data byte. This mechanism is called "byte stuffing". The data value 0x02 is also stuffed.

MODES(S) FOR CARRYING OUT THE INVENTION

In general, the method for generating client credentials for use in transactions with a server, comprises generating in a client computer a token message, encoding said token message as a series of keyboard status code updates; sending said series of keyboard status code updates from said client computer to a USB token attached to said client computer using standard HID interactions; receiving a token response from said USB token, said token response including a dynamic client credential and said token response encoded as a series of emulated keyboard scan codes; receiving said series of emulated keyboard scan codes using standard HID interactions.

In one embodiment of the present invention, said step of generating a token message further includes encoding a dynamic value into said token message. In a particular embodiment, the method further comprises the anterior step of receiving a dynamic value from said server. In another particular embodiment, said dynamic value is combined with at least one of a password entered by a user and a time representation. In a specific embodiment, this password is passed through a cryptographic function prior to said combining.

In one embodiment of the present invention, said scan codes are chosen as codes which do not represent printable characters.

In a set of embodiments of the present invention, the method further comprises monitoring the keyboard focus relating to said attached USB token during said receiving of said token response; and said decoding is conditional upon said monitoring indicating that said keyboard focus was maintained during said receiving of said token response.

In some embodiments of the present invention, the method further comprises the step of decoding said token response to retrieve a dynamic client credential. In some particular embodiments, the method further comprises the step of deriving a second client credential from said retrieved client credential, said second client credential to be used in a transaction with a server. In some other particular embodiments said derivation of said second client credential uses a static password entered by the user. In yet some other particular embodiments said derivation of said second client credential involves the encryption of a static password entered by the user using a symmetric cryptographic algorithm and a session key that is derived from said first client credential.

In some other embodiments said token response, or at least a part of it, or some representation of said dynamic client credential, is used directly as a client credential or to derive a second client credential in ways similar to what has been described above.

In one embodiment of the present invention, the client computer is a personal computer. In another embodiment of the present invention, the client computer is a portable digital assistant (PDA) equipped with at least one USB port. In yet another embodiment of the present invention, the client computer is a mobile telephone equipped with at least one USB port.

In general, a computer program according to the invention to prepare a dynamic client credential for use in a transaction with a server, sends a token message to an attached USB token, said attached USB token emulating a human interface device, and receives a response comprising a client credential from said attached USB token, said response being encoded as emulated keyboard scan codes.

In one embodiment of the present invention, said token message includes a dynamic value. In a particular embodiment, the computer program first receives the dynamic value from said server. In another particular embodiment, said dynamic value is combined with at least one of a password entered by a user and a time representation. In a specific embodiment, this password is passed through a cryptographic function prior to said combining.

In one embodiment of the present invention, said scan codes are selected as codes which do not represent printable characters.

In one set of embodiments of the present invention, said program further requests and verifies possession of the keyboard input focus for the duration of said receiving. In a particular embodiment, said requesting and verifying is done by means of calls to dedicated functions in the application programming interface (API) of the client computer's operating system.

In some embodiments of the present invention, the program further derives a second client credential from said client credential, said second client credential to be used in a transaction with a server. In some particular embodiments said derivation of said second client credential uses a static password entered by the user. In some other particular embodiments said derivation of said second client credential involves the encryption of a static password entered by the user using a symmetric cryptographic algorithm and a session key that is derived from said first client credential.

In one embodiment of the present invention, the program is a Java applet. In another embodiment of the present invention, the program is an ActiveX applet. In yet another embodiment of the present invention, the program is a stand-alone executable.

In general, an apparatus according to the invention for generating client credentials for use in transactions with a server, comprises a USB interface (such as 304) for interacting with a computer through emulation of a human interface device, a memory (such as 302) for storing a secret shared with said server, and an agent (such as 303) for generating a client credential in response to a token message received from said computer through said USB interface. The client credential may be based on at least said secret and at least a dynamic value, said token message being received as a message comprising keyboard status codes and said agent creating said client credential, which is sent by means of a message comprising keyboard scan codes.

Figure 4:
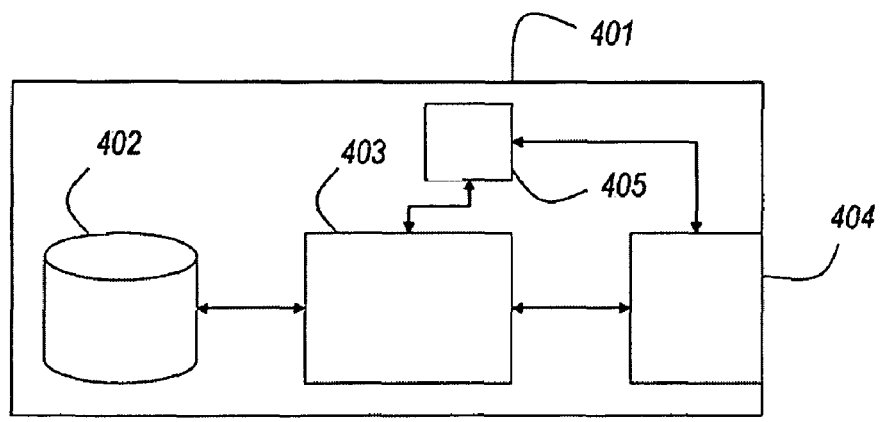
FIG. 4 illustrates an apparatus 401, according to the invention, comprising a USB interface 404 for interacting with a computer through emulation of a human interface device, a memory 402 for storing a secret shared with said server, an agent 403 for generating credentials based on at least said secret and at least a dynamic value received from said computer through said USB interface and decoded by decoder 405.
Figure 5:
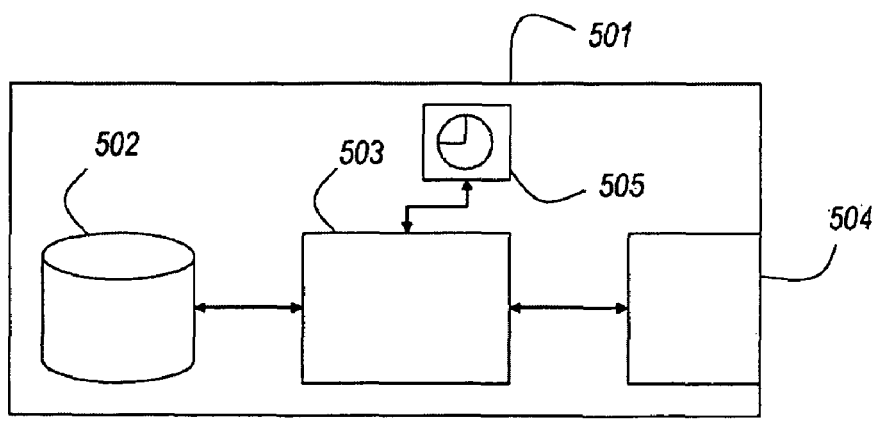
FIG. 5 illustrates an apparatus 501, according to the invention, comprising a USB interface 504 for interacting with a computer through emulation of a human interface device, a memory 502 for storing a secret shared with said server, an agent 503 for generating credentials based on at least said secret and at least a dynamic value provided by event tracker 505.

In one set of embodiments of the present invention, illustrated in FIG. 4, the apparatus 401 further comprises a decoder 405 to extract said dynamic value from said token message, in addition to the aforementioned USB interface 404, memory 402, and agent 403. In a particular embodiment, said dynamic value depends on data related to the transaction that is to be authorized by means of said client credential. In another set of embodiments of the present invention, illustrated in FIG. 5, the apparatus 501 further comprises an event tracker 505, the status of which is used to derive said dynamic value, in addition to the aforementioned USB interface 504, memory 502, and agent 503. In one particular embodiment, said event tracker 505 is a counter. In another particular embodiment, said event tracker 505 is a clock.

In still another set of embodiments of the present invention, said apparatus comprises a decoder and an event tracker, and said agent derives said dynamic value from a combination of at least a value extracted by said decoder from said token message and the status of said event tracker.

In one embodiment of the present invention, said scan codes are selected as codes which do not represent printable characters.

One embodiment of the present invention is also adapted to receive an information retrieval request as a message comprising keyboard status codes and to send a response to said information retrieval request as a message comprising keyboard scan codes. In a particular embodiment, said information retrieval request pertains to production-related data. In another particular embodiment, said information retrieval request pertains to deployment-related data.

In one set of embodiments of the present invention, said client credential is further based on a password received from said computer through said USB interface, wherein said password is received as a message comprising keyboard status codes. In some particular embodiments, said client credential consists of a response and a ciphertext, said response being a first part of a cryptogram generated by encrypting said dynamic variable using a first cryptographic algorithm with said secret as a key, and said ciphertext being the encryption of said password using a second cryptographic algorithm and a second part of said cryptogram as a key. In a very particular embodiment, said first cryptographic algorithm is 3DES and said second cryptographic algorithm is DES CBC. In some embodiments, said password depends on data related to the transaction that is to be authorized by means of said client credential.

In one embodiment of the present invention, said agent for generating credentials based on at least said secret and at least said dynamic value, is a microprocessor. In another embodiment of the present invention, said agent for generating credentials based on at least said secret and at least said dynamic value is an application-specific integrated circuit (ASIC). In yet another embodiment of the present invention, said agent for generating credentials based on at least said secret and at least said dynamic value is a programmable semiconductor device.

In some embodiments of the present invention said generating a dynamic client credential in response to a token message takes into account the time that has passed since an event, which may be, inter alia, the sending of a client credential, or the powering up of the apparatus, or both. In some particular embodiments a response containing an error indication is returned if insufficient time, in comparison to a minimum time, has passed since the last such event. In other particular embodiments, a delay in sending said client credential is inserted until a minimum amount of time has passed from the last such event. In yet other particular embodiments the generation of said client credential involves an indication of the fact that insufficient time, in comparison to a minimum time, has passed since the last such event. In still other particular embodiments an invalid client credential is generated if insufficient time, in comparison to a minimum time, has passed since the last such event. In some embodiments the minimum time that must have passed evolves dynamically in function of the usage history since the last time that the apparatus has been powered on. In a particular embodiment the apparatus must be powered off and powered on again after a certain number of responses have been generated. In some other embodiments the minimum time between two response generations increases and is decreased again only if a sufficiently long time (substantially longer than the minimum time) has elapsed since the previous client credential generation.

The concept of taking into account the time that has passed since an event is also useful outside the context of USB tokens that interact with a computer through emulation of a human interface, especially when the entropy of the generated credential is relatively low. In a general alternative embodiment of that aspect of the invention, the apparatus for generating client credentials for use in transactions with a server comprises an interface for interacting with a computer, a memory for storing a secret shared with said server, and an agent for generating a client credential in response to a token message received from said computer through said interface, based on at least said secret and at least a dynamic value, wherein said generating a dynamic client credential in response to a token message takes into account the time that has passed since an event, which may be, inter alia, the sending of a client credential, or the powering up of the apparatus, or both. In some particular embodiments a response containing an error indication is returned if insufficient time, in comparison to a minimum time, has passed since the last such event. In other particular embodiments, a delay in sending said client credential is inserted until a minimum amount of time has passed from the last such event. In yet other particular embodiments the generation of said client credential involves an indication of the fact that insufficient time, in comparison to a minimum time, has passed since the last such event. In still other particular embodiments an invalid client credential is generated if insufficient time, in comparison to a minimum time, has passed since the last such event. In some embodiments the minimum time that must have passed evolves dynamically in function of the usage history since the last time that the apparatus has been powered on. In a particular embodiment the apparatus must be powered off and powered on again after a certain number of responses have been generated. In some other embodiments the minimum time between two response generations increases and is decreased again only if a sufficiently long time (substantially longer than the minimum time) has elapsed since the previous client credential generation. In another general embodiment, the apparatus is responsive to a command that blocks further generating of client credentials until a certain release event takes place or until a certain time has elapsed from a certain release event. In one embodiment, said release event is a removal and reinsertion of the apparatus into the host computer's interface. In another embodiment, said release event is a power-off power-on cycle of the apparatus. In yet another embodiment, the apparatus further comprises a release button, and the release event is said button being pressed. In yet another embodiment, the apparatus is adapted to include a counter value in the token response message, such that the authenticating entity can reject any client credential with a counter value outside a predetermined range, such a range exception being indicative of a replay or preplay attack.

While various embodiments of the present invention have been described above, it should be understood that they have been presented by way of example only, and not limitation. Thus, the breadth and scope of the present invention should not be limited by any of the above described exemplary embodiments but should be defined only in accordance with the following claims and their equivalents.

REFERENCES

US 20040098596 A (RAINBOW TECHNOLOGIES, INC.) 10.11.2003

USB Implementers Forum. Universal Serial Bus Specification Revision 2.0. Compaq Computer Corporation et al., 2000.

USB Implementers' Forum. Device Class Definition for Human Interface Devices (HID) Version 1.11. USB Implementers' Forum, 2001.

The invention claimed is:

1. A method for generating client credentials for use in transactions between a client computer and a server, said client computer including an attached universal serial bus (USB) token, said method comprising
    generating a token message;
    encoding said token message as a series of keyboard status code updates;
    sending said series of keyboard status code updates from said client computer to said USB token using standard human interface device (HID) interactions;
    receiving a token response from said USB token, said token response encoded by said USB token as a series of emulated keyboard scan codes and received using standard HID interactions, wherein said token response includes a first dynamic client credential for authenticating to said server a user of said client computer or indicating to said server approval by said user of a transaction between said client computer and said server, and said first dynamic client credential is generated by said USB token in response to receiving said token message by performing a cryptographic algorithm on at least a dynamic value using a secret stored on said USB token;
    decoding said token response including said first dynamic client credential to retrieve said first dynamic client credential from said token response by decoding said received series of emulated keyboard scan codes; and
    transmitting a second client credential to said server, wherein said second client credential is related to said first dynamic client credential.

2. The method of claim 1, further comprising encoding a dynamic value and including said encoded dynamic value in said token message.

3. The method of claim 2, further comprising receiving said dynamic value from said server prior to said encoding of said dynamic value.

4. The method of claim 1, wherein said second client credential is cryptographically derived from a representation of said first dynamic client credential.

5. The method of claim 4, wherein said second client credential comprises a response and ciphertext, said response comprising a part of said representation of said first dynamic client credential, and said ciphertext resulting from encryption of a password using a different part of said representation as a key.

6. The method of claim 5, wherein said encryption employs a DES CBC algorithm.

7. The method of claim 1, wherein said token message is encoded as a plurality of Report_out data packets containing changes in state of one or more of CAPS LOCK, NUM LOCK, and SCROLL LOCK.

8. The method of claim 7, wherein consecutive Report_out data packets differ in exactly one LOCK state.

9. The method of claim 7, wherein bits of said token message are mapped onto a state of a first one of CAPS LOCK, NUM LOCK, and SCROLL LOCK in Report_out data packets, while another one of CAPS LOCK, NUM LOCK, and SCROLL LOCK is toggled between consecutive Report_out data packets if and only if the values of said first one of CAPS LOCK, NUM LOCK, and SCROLL LOCK in said consecutive Report_out data packets are identical.

10. The method of claim 7, wherein at least a first one of CAPS LOCK, NUM LOCK, and SCROLL LOCK is toggled between consecutive Report_out data packets, while bits of said token message are mapped on a state of at least a second one of the remaining of CAPS LOCK, NUM LOCK, and SCROLL LOCK.

11. The method of claim 10, wherein transmission of said token message is preceded by a Report_out data packet representing toggling a state of said first one of CAPS LOCK or NUM LOCK or SCROLL LOCK, and clearing or setting at least said second one of CAPS LOCK, NUM LOCK, and SCROLL LOCK.

12. The method of claim 7, additionally comprising receiving a confirmation message from said USB token confirming receipt of at least one of said Report_out data packets.

13. The method of claim 12, wherein said confirmation message includes a state of one or more of NUM LOCK, CAPS LOCK, and SCROLL LOCK of said USB token.

14. The method of claim 1, wherein said standard HID interactions used in sending said series of keyboard status code updates comprise a plurality of Report_out data packets, said Report_out data packets including at least one status bit which is toggled between consecutive Report_out data packets, while bits of said token message are mapped on one or more other status bits of said Report_out data packets.

15. The method of claim 1, wherein said standard HID interactions used in receiving said series of emulated keyboard scan codes comprise a plurality of Output Reports.

16. The method of claim 1, wherein said scan codes do not represent printable characters.

17. The method of claim 1, wherein said scan codes represent characters which may be generated by physical keystrokes on standard keyboards.

18. The method of claim 1, further comprising monitoring keyboard focus relating to said USB token during said receiving of said token response; and wherein said decoding is conditional upon said monitoring indicating that said keyboard focus was maintained during said receiving of said token response.

19. A non-transitory computer-readable storage medium containing a program for a computer, including an attached universal serial bus (USB) token, that when executed causes the computer to obtain a first dynamic client credential for use in a transaction with a server, said program:
generating a token message;
encoding said token message as a series of keyboard status code updates;
sending said series of keyboard status code updates from said client computer to said USB token using standard human interface device (HID) interactions;
receiving a token response from said USB token, said response encoded by said USB token as a series of emulated keyboard scan codes that are received using standard HID interactions, wherein said token response includes the first a dynamic client credential for authenticating to said server a user of said computer or indicating to said server approval by said user of a transaction between said computer and said server, and said first dynamic client credential is generated by said USB token in response to receiving said token message by performing a cryptographic algorithm on at least a dynamic value using a secret stored on said USB token;
decoding said token response including said first dynamic client credential to retrieve said first dynamic client credential from said token response by decoding said received series of emulated keyboard scan codes; and
transmitting a second client credential to said server, wherein said second client credential is related to said first dynamic client credential.

20. The medium of claim 19, wherein the program further causes the computer to encode a dynamic value and include said encoded dynamic value in said token message.

21. The medium of claim 20, wherein said dynamic value is received by said computer from said server, prior to said encoding of said dynamic value.

22. The medium of claim 19, wherein said second client credential is cryptographically derived from a representation of said first dynamic client credential.

23. The medium of claim 22, wherein said second client credential comprises a response and a ciphertext, said response comprising a part of said representation of said first dynamic client credential, and said ciphertext comprising a result of encrypting a password using a different part of said representation as a key.

24. The medium of claim 23, wherein said encrypting employs a DES CBC algorithm.

25. The medium of claim 19, wherein said token message is encoded as a plurality of Report_out data packets containing changes in the state of one or more of CAPS LOCK, NUM LOCK, and SCROLL LOCK.

26. The medium of claim 25, wherein consecutive Report_out data packets differ in exactly one LOCK state.

27. The medium of claim 25, wherein bits of said token message are mapped onto a state of a first one of CAPS LOCK, NUM LOCK, and SCROLL LOCK in Report_out data packets, while another one of CAPS LOCK, NUM LOCK, and SCROLL LOCK is toggled between consecutive Report_out data packets if and only if the values of said first one of CAPS LOCK, NUM LOCK, and SCROLL LOCK in said consecutive Report_out data packets are identical.

28. The medium of claim 25, wherein at least a first one of CAPS LOCK, NUM LOCK, and SCROLL LOCK is toggled between consecutive Report_out data packets, while bits of said token message are mapped on a state of at least a second one of the remaining of CAPS LOCK, NUM LOCK, and SCROLL LOCK.

29. The medium of claim 28, wherein transmission of said token message is preceded by a Report_out data packet representing toggling a state of said first one of CAPS LOCK or NUM LOCK or SCROLL LOCK, and clearing or setting at least said second one of CAPS LOCK, NUM LOCK, and SCROLL LOCK.

30. The medium of claim 25, additionally comprising receiving a confirmation message from said USB token confirming receipt of at least one of said Report_out data packets.

31. The medium of claim 30, wherein said confirmation message includes a state of one or more of NUM LOCK, CAPS LOCK, and SCROLL LOCK of said USB token.

32. The medium of claim 19, wherein said token message is encoded as a plurality of Report_out data packets, of which at least one status bit is toggled between consecutive Report_out data packets, while bits of said token message are mapped on one or more other status bits of said Report_out data packets.

33. The medium of claim 19, wherein said token response is encoded as a plurality of Output Reports.

34. The medium of claim 19, wherein said scan codes do not represent printable characters.

35. The medium of claim 19, wherein said scan codes represent characters which may be generated by physical keystrokes on standard keyboards.

36. The medium of claim 19, wherein said program further requests and verifies exclusive possession of keyboard focus during said receiving.

37. An apparatus for generating dynamic client credentials for use in transactions with a server in response to a token message from a computer, said apparatus comprising:
a universal serial bus (USB) interface for interacting with said computer through emulation of a human interface device,
a memory for storing a secret shared with said server, and an agent configured to:
receive a token message from said computer, said token message encoded as a series of keyboard status code updates received using standard human interface device (HID) interactions,
generate a token response including a first dynamic client credential for authenticating to said server a user of said computer or indicating to said server approval by said user of a transaction between said computer and said server,
wherein said first dynamic client credential is generated in response to receiving said token message by performing a cryptographic algorithm on at least a dynamic value using said stored secret, and said token response is encoded as a series of emulated keyboard scan codes, and
transmit said token response to said computer,
wherein said computer decodes said token response including said first dynamic client credential to retrieve said first dynamic client credential from said token response by decoding said received series of emulated keyboard scan codes, and
wherein said computer then transmits a second client credential to said server, said second client credential being related to said first dynamic client credential.

38. The apparatus of claim 37, further comprising a decoder to extract said dynamic value from said token message.

39. The apparatus of claim 37, further comprising an event tracker, and wherein said agent creates said dynamic value from status of said event tracker.

40. The apparatus of claim 39, wherein said event tracker is a counter.

41. The apparatus of claim 39, wherein said event tracker is a clock.

42. The apparatus of claim 37, wherein said token message is encoded as a plurality of Report_out data packets containing changes in the state of one or more of CAPS LOCK, NUM LOCK, and SCROLL LOCK.

43. The apparatus of claim 42, wherein consecutive Report_out data packets differ in exactly one of CAPS LOCK, NUM LOCK or SCROLL LOCK state.

44. The apparatus of claim 42, wherein bits of said token message are mapped onto a state of a first one of the parameters CAPS LOCK, NUM LOCK, and SCROLL LOCK in Report_out data packets, while another one of said parameters CAPS LOCK, NUM LOCK, and SCROLL LOCK is toggled between consecutive Report_out data packets if and only if the values of said first one of CAPS LOCK, NUM LOCK, and SCROLL LOCK in said consecutive Report_out data packets are identical.

45. The apparatus of claim 42, wherein at least one of the parameters CAPS LOCK, NUM LOCK, and SCROLL LOCK is toggled between consecutive Report_out data packets, while bits of said token message are mapped on the state of at least one of the remaining of the parameters CAPS LOCK, NUM LOCK, and SCROLL LOCK.

46. The apparatus of claim 37, wherein said token message is encoded as a plurality of Report_out data packets, of which at least one status bit is toggled between consecutive Report_out data packets, while, bits of said token message are mapped on one or more other status bits of said Report_out data packets.

47. The apparatus of claim 37, wherein the said token response is encoded as a plurality of Output Reports.

48. The apparatus of claim 37, wherein said scan codes are selected as codes which do not represent printable characters.

49. The apparatus of claim 37, wherein said scan codes represent characters which may be generated by physical keystrokes on standard keyboards.

50. The apparatus of claim 37, wherein said agent is further adapted to receive an information retrieval request as a message comprising keyboard status codes and to send a response to said information retrieval request as a message comprising keyboard scan codes.

51. The apparatus of claim 37, wherein said credential is further based on a password received from said computer through said USB interface, wherein said password is received in a message comprising keyboard status codes.

52. The apparatus of claim 51, wherein said credential comprises a response and a ciphertext, said response being a part of a cryptogram generated by encrypting said dynamic value using a first cryptographic algorithm with said secret as a key, and said ciphertext being the encryption of said password using a second cryptographic algorithm and a different part of said cryptogram as a key.

53. The apparatus of claim 52, wherein said first cryptographic algorithm is 3DES and wherein said second cryptographic algorithm is DES CBC.

54. The apparatus of claim 42, further adapted to send a confirmation message confirming receipt of at least one of said Report_out data packets.

55. The apparatus of claim 54, wherein said confirmation message includes a state of one or more of NUM LOCK, CAPS LOCK, and SCROLL LOCK.

56. The apparatus of claim 37 further limiting the number of valid client credentials which may be generated or retrieved.

57. The apparatus of claim 37 further limiting the number of valid client credentials which may be generated or retrieved per time period.

58. The apparatus of claim 37 further limiting the number of valid client credentials which may be generated or retrieved since the last power on of said apparatus.

59. The apparatus of claim 37 further being responsive to a message comprising a command instructing said apparatus to inhibit the generation or retrieval of valid client credentials until a release event takes place.

60. The method of claim 1, further comprising decoding said token response to retrieve said first dynamic client credential.

61. The medium of claim 19, wherein the program further causes the computer to decode said token response to retrieve said first dynamic client credential.

62. The method of claim 1,
wherein said token message includes a dynamic challenge generated by said server and a password entered into said client computer by said user,
wherein said token response incudes said dynamic challenge encrypted by said USB token using said secret stored on said USB token, and a ciphertext generated by said USB token using a session key to encrypt said password, and
wherein said server decrypts said password from said ciphertext using said session key.

63. The non-transitory computer readable storage medium of claim 19,
wherein said token message includes a dynamic challenge generated by said server and a password entered into said computer by said user,
wherein said token response incudes said dynamic challenge encrypted by said USB token using said secret stored on said USB token, and a ciphertext generated by said USB token using a session key to encrypt said password, and
wherein said server decrypts said password from said ciphertext using said session key.

64. The apparatus of claim 37,
wherein said token message received by said agent includes a dynamic challenge generated by said server and a password entered into said computer by said user,
wherein said token response generated by said agent incudes said dynamic challenge encrypted by said agent using said secret stored in said memory, and a ciphertext generated by said agent using a session key to encrypt said password, and
wherein said server decrypts said password from said ciphertext using said session key.

65. The method of claim 1, wherein said second client credential comprises a representation of said first dynamic client credential.

66. The medium of claim 19, wherein said second client credential comprises a representation of said first dynamic client credential.

67. The apparatus of claim 37, wherein said second client credential comprises a representation of said first dynamic client credential.

* * * * *

UNITED STATES PATENT AND TRADEMARK OFFICE
CERTIFICATE OF CORRECTION

| | | |
|---|---|---|
| PATENT NO. | : 8,214,888 B2 | Page 1 of 1 |
| APPLICATION NO. | : 12/138979 | |
| DATED | : July 3, 2012 | |
| INVENTOR(S) | : Frederick Noe et al. | |

It is certified that error appears in the above-identified patent and that said Letters Patent is hereby corrected as shown below:

(a) On the Cover Page, Item (75), line 2, should be corrected:

"Hoornaert, Wemmel (BE); Dirk" should read: -- Hoornaert, Bertem (BE); Dirk --.

(b) Column 18, line 2, should be corrected:

"includes the first a dynamic client credential for authen-" should read: -- includes the first dynamic client credential for authen- --.

(c) Column 21, line 20, should be corrected:

"wherein said token response incudes said dynamic chal-" should read: -- wherein said token response includes said dynamic chal- --.

(d) Column 22, line 8, should be corrected:

"incudes said dynamic challenge encrypted by said agent" should read: -- includes said dynamic challenge encrypted by said agent --.

Signed and Sealed this
Second Day of October, 2012

David J. Kappos
*Director of the United States Patent and Trademark Office*